United States Patent
Oda

(10) Patent No.: US 9,785,139 B2
(45) Date of Patent: Oct. 10, 2017

(54) WORKING MACHINE FEED AXIS CONTROL METHOD AND FEED AXIS CONTROL DEVICE

(71) Applicant: MAKINO MILLING MACHINE CO., LTD., Tokyo (JP)

(72) Inventor: Mitsunari Oda, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 230 days.

(21) Appl. No.: 14/772,678

(22) PCT Filed: Feb. 28, 2014

(86) PCT No.: PCT/JP2014/055130
§ 371 (c)(1),
(2) Date: Sep. 3, 2015

(87) PCT Pub. No.: WO2014/136686
PCT Pub. Date: Sep. 12, 2014

(65) Prior Publication Data
US 2016/0004248 A1 Jan. 7, 2016

(30) Foreign Application Priority Data

Mar. 7, 2013 (JP) .................................. 2013-045163

(51) Int. Cl.
*G06F 17/50* (2006.01)
*G05B 19/416* (2006.01)
*G05B 19/19* (2006.01)

(52) U.S. Cl.
CPC ......... *G05B 19/4166* (2013.01); *G05B 19/19* (2013.01); *G05B 2219/32276* (2013.01); *G05B 2219/42063* (2013.01)

(58) Field of Classification Search
CPC .............. G05B 19/4166; G05B 19/19; G05B 2219/32276; G05B 2219/42063
See application file for complete search history.

(56) References Cited

U.S. PATENT DOCUMENTS

| | | | |
|---|---|---|---|
| 5,384,525 A | | 1/1995 | Kato |
| 5,418,440 A | * | 5/1995 | Sakaguchi ......... G05B 19/4061 318/560 |

(Continued)

FOREIGN PATENT DOCUMENTS

| | | |
|---|---|---|
| CN | 103189807 A | 7/2013 |
| JP | 61-58013 | 3/1986 |

(Continued)

OTHER PUBLICATIONS

International Search Report mailed May 13, 2014, directed to International Application No. PCT/JP2014/055130, 1 page.

(Continued)

*Primary Examiner* — Ramesh Patel
(74) *Attorney, Agent, or Firm* — Morrison & Foerster LLP

(57) ABSTRACT

A working machine feed axis control device: disposes a velocity feedback loop and forms a cascade coupling on the inner side of a location feedback loop; comprises a velocity gain setting apparatus (30) which multiplies the output of the velocity feedback look by a first gain (kv), and a location gain setting apparatus (31) which multiplies the output of the location feedback loop by a second gain (kp); subtracts the output of the velocity gain setting apparatus (30) and the output of the location gain setting apparatus (31) from a torque instruction ($\tau$); and outputs the remaining torque instruction ($\tau$) to a subject to be controlled (27).

3 Claims, 8 Drawing Sheets

(56) References Cited

U.S. PATENT DOCUMENTS

| | | | | |
|---|---|---|---|---|
| 5,869,108 A * | 2/1999 | Hiraoka | B29C 45/5008 | 264/40.7 |
| 6,211,636 B1 * | 4/2001 | Matsubara | B30B 15/14 | 318/432 |
| 6,211,640 B1 * | 4/2001 | Fujisaki | H02P 6/17 | 318/163 |
| 7,421,308 B2 * | 9/2008 | Nussbaum | G06K 7/10851 | 250/236 |
| 9,360,849 B2 * | 6/2016 | Kawana | G05B 19/416 | |
| 9,477,218 B2 * | 10/2016 | Kawana | G05B 19/404 | |
| 9,588,509 B2 * | 3/2017 | Kawana | G05B 19/404 | |
| 2003/0111973 A1 * | 6/2003 | Iwashita | G05B 19/19 | 318/625 |
| 2005/0067996 A1 * | 3/2005 | Eba | G05B 19/19 | 318/609 |
| 2008/0058982 A1 * | 3/2008 | Gray | B25J 9/1602 | 700/159 |
| 2012/0283851 A1 * | 11/2012 | Yamamoto | G05B 19/19 | 700/56 |
| 2013/0138236 A1 * | 5/2013 | Nagaoka | G05B 19/19 | 700/108 |
| 2013/0173026 A1 * | 7/2013 | Kawana | G05B 19/416 | 700/30 |
| 2013/0173045 A1 * | 7/2013 | Kawana | G05B 19/404 | 700/186 |
| 2013/0173046 A1 * | 7/2013 | Kawana | G05B 19/404 | 700/186 |

FOREIGN PATENT DOCUMENTS

| | | |
|---|---|---|
| JP | H-6-4809 | 1/1994 |
| JP | 3454616 | 10/2003 |
| JP | 2010-97310 | 4/2010 |
| WO | WO-2012/057219 | 5/2012 |

OTHER PUBLICATIONS

Tungpataratanawong, S. et al. "Force Sensor-less Workspace Impedance Control Considering Resonant Vibration of Industrial Robot", IECON 2005. 31st Annual Conference of IEEE, Nov. 6, 2005, Piscataway, NJ, pp. 1878-1883.

Spong, Mark W. et al. (1989). "Multivariable Control" Chapter 8 in *Robot Dynamics and Control*. John Wiley and Sons, LLP, pp. 216-240.

* cited by examiner

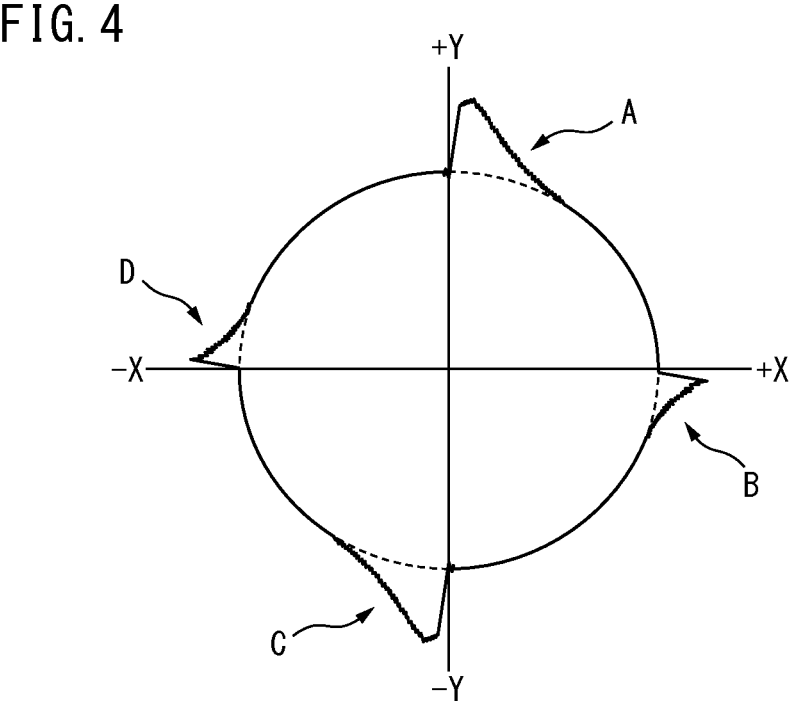
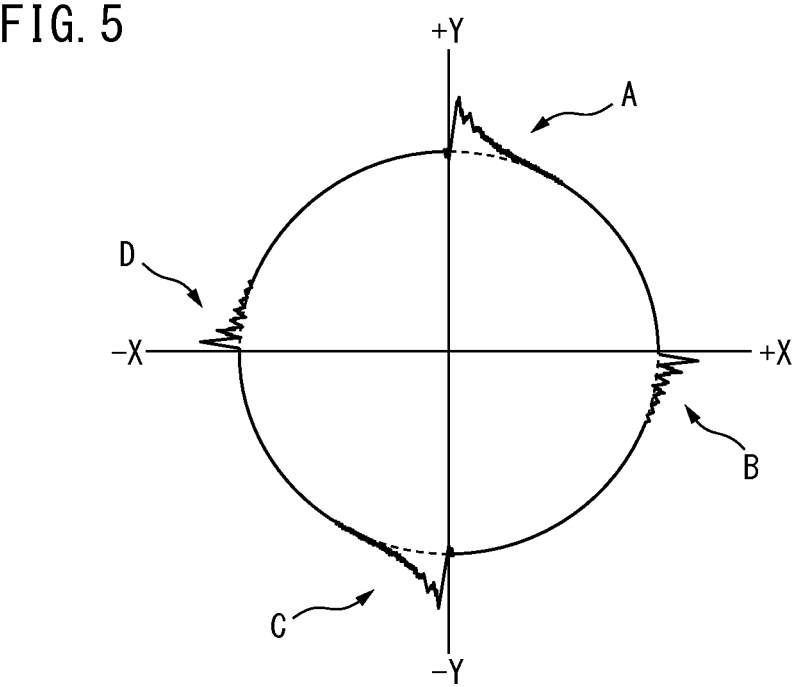

WORKING MACHINE FEED AXIS CONTROL METHOD AND FEED AXIS CONTROL DEVICE

CROSS-REFERENCE TO RELATED APPLICATIONS

This application is a U.S. National Phase patent application of International Patent Application No. PCT/JP2014/055130, filed on Feb. 28, 2014, which claims the priority of Japanese Application No. 2013-045163 filed Mar. 7, 2013, which is hereby incorporated by reference in the present disclosure in its entirety.

FIELD OF THE INVENTION

The present invention relates to a feed axis control method and feed axis control of a machine tool, which control a servo motor for driving the feed axis of a machine tool by means of a control circuit having a position feedback loop and a velocity feedback loop.

BACKGROUND OF THE INVENTION

A method of controlling a servo motor for driving a feed axis through a control circuit in which cascade-connection is formed by providing a velocity feedback loop inside the position feedback loop, has thus far been known (for example, as disclosed in Patent Literature 1). The method according to PTL 1 includes calculating a predicted processing load on the basis of processing data such as the shape of a work, a processing instruction based on a processing program, and a position command, and adding the predicted processing load as predicted load command to an acceleration command to be outputted to a servo amplifier, in order to cope with a delay of the servo control unit arising from load fluctuation during the processing.

CITATION LIST

Patent Literature 1: Japanese Patent No. 3454616

SUMMARY OF THE INVENTION

However, some types of disturbances acting on the feed axis are unpredictable. Therefore, the method in which the predicted processing load is calculated and added to the acceleration command as the control method disclosed in PTL 1 is not sufficient for handling the unpredictable disturbances.

In an aspect, the present invention provides a machine tool feed axis control method including forming a cascade-connection in which a velocity feedback loop including a velocity control unit is provided inside a position feedback loop including a position control unit to which a position command is inputted, and controlling a servo motor for driving the feed axis in accordance with a torque command outputted from a velocity control unit, the method including subtracting from the torque command a first state feedback signal obtained by multiplying an output of the velocity feedback loop by a first gain and a second state feedback signal obtained by multiplying an output of the position feedback loop by a second gain, and outputting the torque command after the subtraction to a control object including the servo motor.

In another aspect, the present invention provides a machine tool feed axis control device including a cascade-connection in which a velocity feedback loop including a velocity control unit is provided inside a position feedback loop including a position control unit to which a position command is inputted, and controlling a servo motor for driving the feed axis in accordance with a torque command outputted from a velocity control unit, the device including a first multiplication unit which multiplies an output of the velocity feedback loop by a first gain, a second multiplication unit which multiplies an output of the position feedback loop by a second gain, and an output unit which subtracts an output of the first multiplication unit and an output of the second multiplication unit from the torque command, and outputs the torque command after the subtraction to a control object including the servo motor.

With the present invention, the torque command from which the state feedback signal, obtained by multiplying the output of the feedback loop by the gain, has been subtracted is outputted to the control object. Such an arrangement stabilizes the control system, and allows the feedback gain to be increased. Therefore, many types of disturbances can be effectively suppressed.

BRIEF DESCRIPTION OF THE DRAWINGS

FIG. 4 is a diagram representing an example of movement locus of a tool obtained upon performing circular processing with the configuration according to the block diagram of FIG. 3.

FIG. 5 is a diagram representing an example of movement locus of the tool obtained upon performing the circular processing with the configuration according to the block diagram of FIG. 3, with an increased gain.

DETAILED DESCRIPTION OF THE INVENTION

Figure 1:
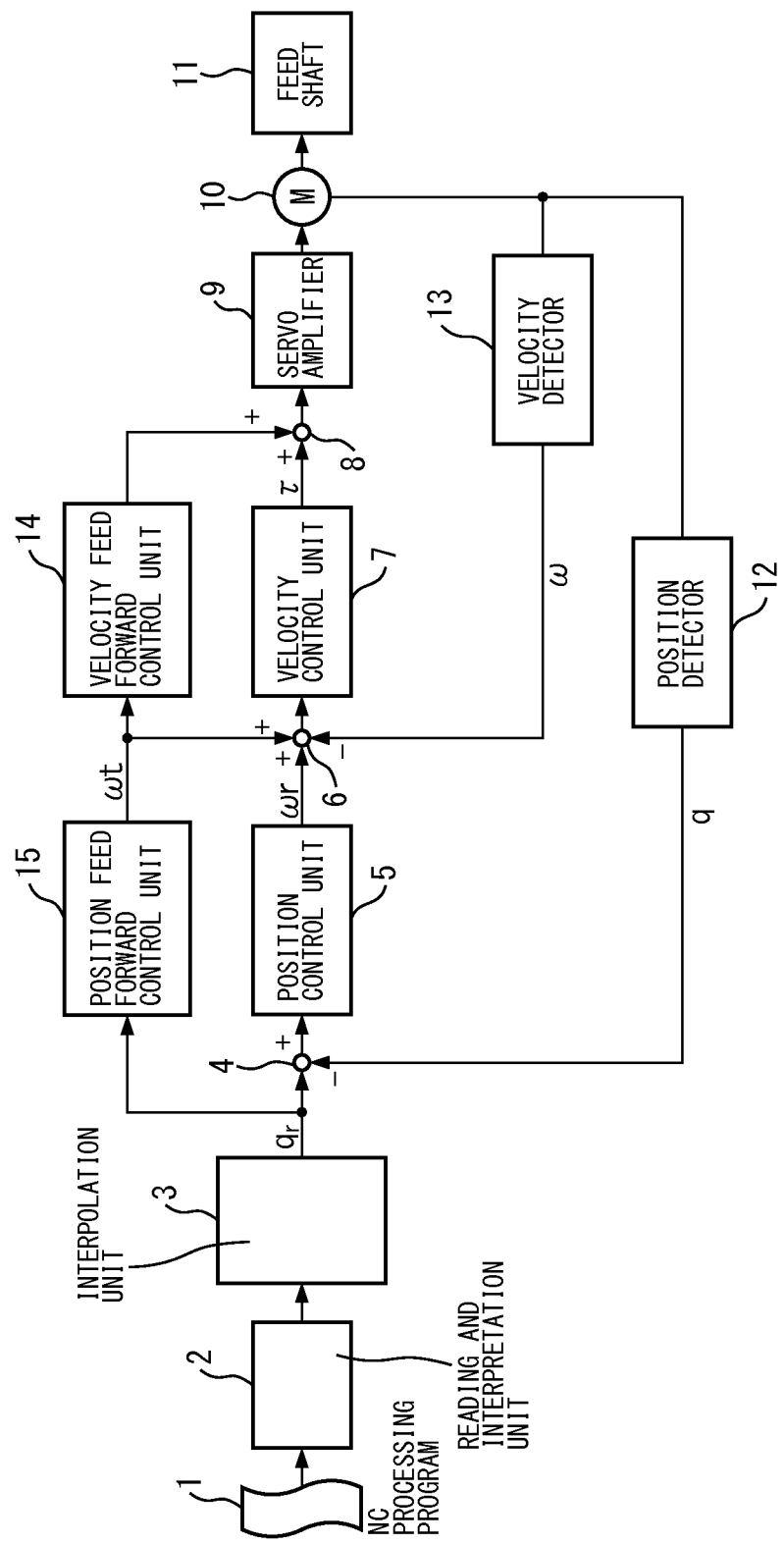
FIG. 1 is a block diagram representing a hardware configuration of a machine tool feed axis control device according to an embodiment of the present invention.

Hereafter, an embodiment of a machine tool feed axis control device according to the present invention will be described, with reference to FIG. 1 to FIG. 10. FIG. 1 is a block diagram representing a hardware configuration of the machine tool feed axis control device according to the embodiment of the present invention. The machine tool may be exemplified by NC machine tool such as a machining center including a feed axis driven by a servo motor, and the feed axis control device constitutes a part of the numerical control device.

As illustrated in FIG. 1, an NC processing program 1 installed in the numerical control device is inputted in an interpolation unit 3 through a reading and interpretation unit 2. The interpolation unit 3 outputs a position command qr for the driving servo motor of each of the feed axis (e.g., an X-direction axis). The position command qr (rotational position command of the motor) outputted from the interpolation unit 3 is inputted to a position control unit 5 through an adder 4. The position control unit 5 generates a velocity command ωr (rotation velocity command of the motor), and the velocity command ωr is inputted to a velocity control unit 7 through an adder 6. The velocity control unit 7 generates a torque command τ, and the torque command τ is inputted to a servo amplifier 9 through an adder 8. The servo amplifier 9 supplies a control current to a servo motor 10 so as to generate a torque according to the inputted torque command τ. The supplied current causes the servo motor 10 to rotate, to thereby drive the feed shaft 11.

The servo motor 10 includes a built-in rotary encoder which detects a rotation amount of the motor. A position detector 12 detects a rotational position of the motor on the basis of a signal from the rotary encoder, and feeds back the position signal q to the adder 4. The adder 4 subtracts the position signal q from the position command qr and outputs the subtracted value to the position control unit 5. The velocity detector 13 differentiates the signal from the rotary encoder to thereby detect the motor rotation velocity, and feeds back a velocity signal ω to the adder 6.

The position command qr outputted from the interpolation unit 3 is also inputted to a position feed forward control unit 15. The position feed forward control unit 15 outputs a feed forward command related to the velocity (velocity feed forward command) to the velocity feed forward control unit 14 and the adder 6. The adder 6 adds the velocity feed forward command to and subtracts the velocity signal ω from the velocity command ωr, and outputs the obtained value to the velocity control unit 7. The velocity feed forward control unit 14 outputs a feed forward command related to the torque (torque feed forward command) to the adder 8. The adder 8 adds the torque feed forward command to the torque command τ, and outputs the obtained value to the servo amplifier 9.

Figure 2:
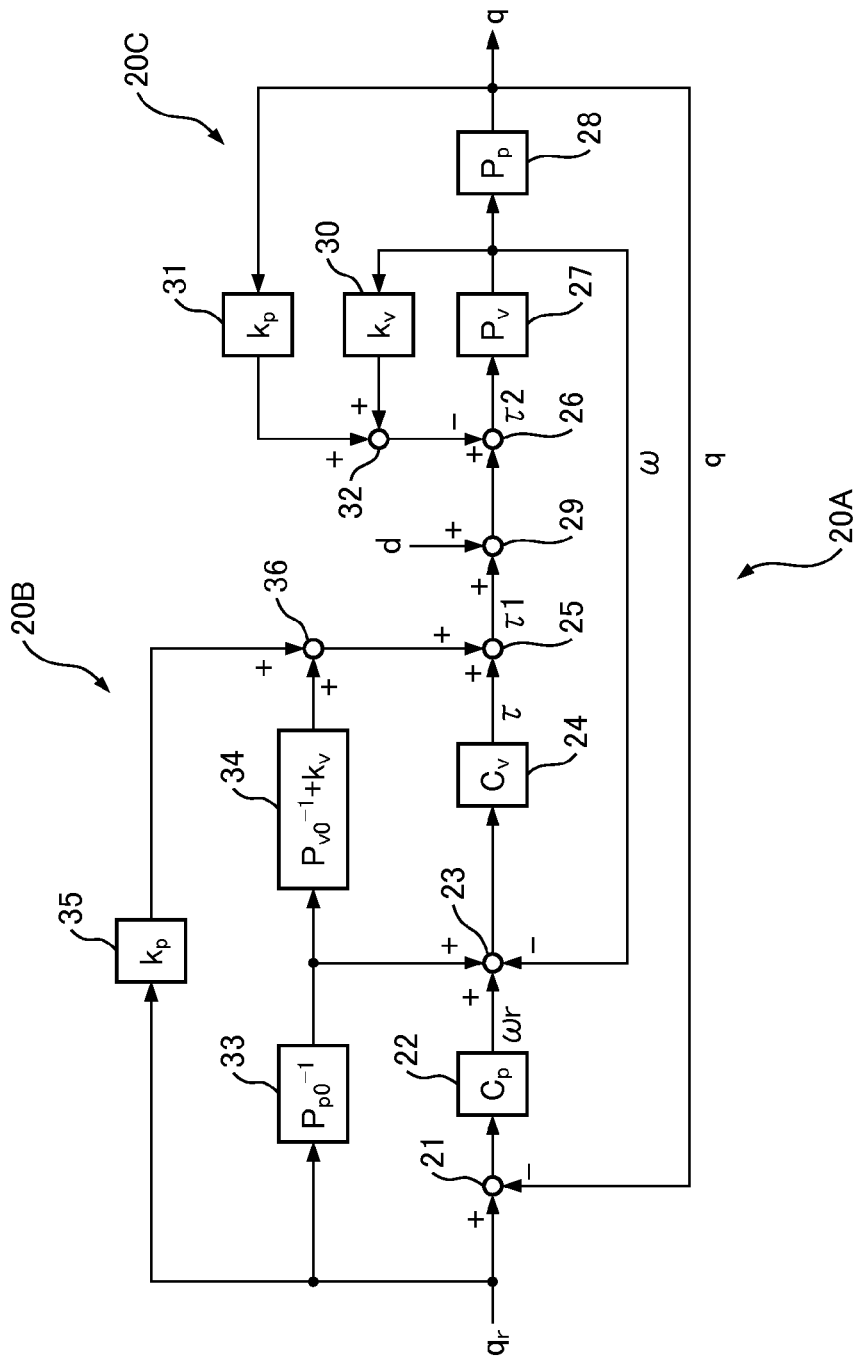
FIG. 2 is a block diagram representing a configuration of the feed axis control device according to the embodiment of the present invention.

FIG. 2 is a block diagram representing a configuration of the feed axis control device according to the embodiment of the present invention. The block diagram of FIG. 2 is a conversion from the block diagram of FIG. 1, and includes a feedback loop 20A related to the position and the velocity, a feed forward loop 20B related to the position and the velocity, and a state feedback loop 20C related to the position and the velocity. FIG. 2 illustrates an imaginary block diagram representing a basic configuration of the feed axis control device, and more specific block diagrams will be subsequently described with reference to FIG. 8 to FIG. 10.

First, the feedback loop 20A will be described. The feedback loop 20A is a double feedback loop including the position feedback loop and the velocity feedback loop provided inside the position feedback loop, and constitutes a cascade connection. To be more detailed, first the position command qr is inputted to a compensator of the position feedback loop, i.e., a position compensator 22, through an adder 21. The position compensator 22 is a function of S represented by Cp. The position compensator 22 multiplies a difference between the inputted position command and the position feedback loop by a gain (Cp), to thereby generate the velocity command ωr.

The velocity command ωr outputted from the position compensator 22 is inputted in a compensator of the velocity feedback loop, i.e., a velocity compensator 24, through an adder 23. The velocity compensator 24 is a function of S represented by Cv. The velocity compensator 24 multiplies a difference between the inputted velocity command and the velocity feedback loop by a gain (Cv), to thereby generate the torque command τ. The torque command τ outputted from the velocity compensator 24 is turned into a torque command τ1 through an adder 25, and then to a torque command τ2 through an adder 26.

The torque command τ2 is inputted in a control object, i.e., a velocity control object 27 of the velocity feedback loop. The velocity control object 27 is modeled by Pv. The velocity control object 27 outputs the velocity signal ω representing the detected value of the motor rotation velocity. The velocity signal ω is inputted in a control object of the position feedback loop, i.e., a position control object 28, and fed back to the adder 23. The position control object 28 is modeled by Pp. The position control object 28 outputs the position signal q representing the detected value of the rotational position of the motor. The position signal q is fed back to the adder 21.

The machine tool may be subjected to a disturbance, which is an uncertainty factor arising from a cutting load or other conditions. In FIG. 2, a disturbance d is added to the torque command τ1 through an adder 29 provided between the adder 25 and the adder 26. To improve suppression performance against the disturbance d, it is preferable to increase the gain of the compensators 22 and 24 in the feedback loop. However, the feedback control system acts with a delay, and may oscillate with an excessive increase of the gain. Accordingly, the gain is unable to be sufficiently increased, and therefore a large difference may be created between the position command qr and the actual position q, when the system is subjected to the disturbance d.

Taking the mentioned point into account, in this embodiment the state feedback loop 20C is added to the control circuit, so as to correct the torque command with the state feedback obtained by multiplying the output of the control objects 27 and 28 by the gain. To be more detailed, the velocity signal ω outputted from the velocity control object 27 is inputted in the velocity gain setter 30. The velocity gain setter 30 multiplies the velocity signal ω by a state feedback gain related to the velocity kv (velocity gain), to thereby generate the torque command. The position signal q outputted from the position control object 28 is inputted in the position gain setter 31. The position gain setter 31 multiplies the position signal q by a state feedback gain kp related to the position (position gain), to thereby generate the torque command.

The torque commands respectively outputted from the gain setters 30 and 31 are added in an adder 32 and subtracted from the torque command τ1 in the adder 26. The torque command τ1 is thus corrected with the state feedback, which contributes to improve the stability of the control objects 27 and 28. Therefore, the gain of the compensators 22 and 24 can be increased, so that the suppression performance against the disturbance d can be improved.

The position gain kp and the velocity gain kv, respectively set in advance by the position gain setter 31 and the velocity gain setter 30 may be determined through a designing method based on an optimal regulator. The gain of the compensators 22 and 24 in the feedback loop may be determined by increasing the gain to the point where the control system oscillates, and multiplying the gain at that point by a predetermined safety factor. Alternatively, a designing method based on an optimal servo control may be adopted to decide the gain of the gain setters 31 and 30, and the compensators 22 and 24.

The configuration of the feed forward loop 20B will now be described. First the position command qr is inputted in a compensator of the feed forward loop related to the position, i.e., a position compensator 33. The position compensator 33 multiplies the position command qr by the reciprocal $Pp_0^{-1}$ of a nominal model $Pp_0$ of the position control object 28, to thereby generate the velocity command. Here, the nominal model $Pp_0$ refers to a position control object based on the design value. The velocity command outputted from the position compensator 33 is inputted in a compensator of the feed forward loop related to the velocity, i.e., a velocity compensator 34, and added in the adder 23.

The velocity compensator 34 multiplies the velocity command outputted from the position compensator 33 by a sum of the reciprocal $Pv_0^{-1}$ of a nominal model $Pv_0$ of the velocity control object 27 and the velocity gain kv, to thereby generate the torque command. The nominal model $Pv_0$ refers to a velocity control object based on the design value. The position command qr is also inputted in a compensator of the feed forward loop related to the velocity, i.e., a velocity compensator 35. The velocity compensator 35 multiplies the position command qr by the position gain kp, to thereby generate the torque command. The torque commands respectively outputted from the velocity compensators 34 and 35 are added in an adder 36, and then in the adder 25.

Thus, in the feed forward loop 20B the position command and the velocity command, respectively multiplied by the position gain kp and the velocity gain kv, are outputted, and added to the torque command τ. Such an arrangement enables a high-quality feed forward control to be performed, in which the subtraction of the values obtained by respectively multiplying the position command and the velocity command by the position gain kp and the velocity gain kv from the torque command τ1 in the state feedback loop 20C is taken into account.

Figure 3:
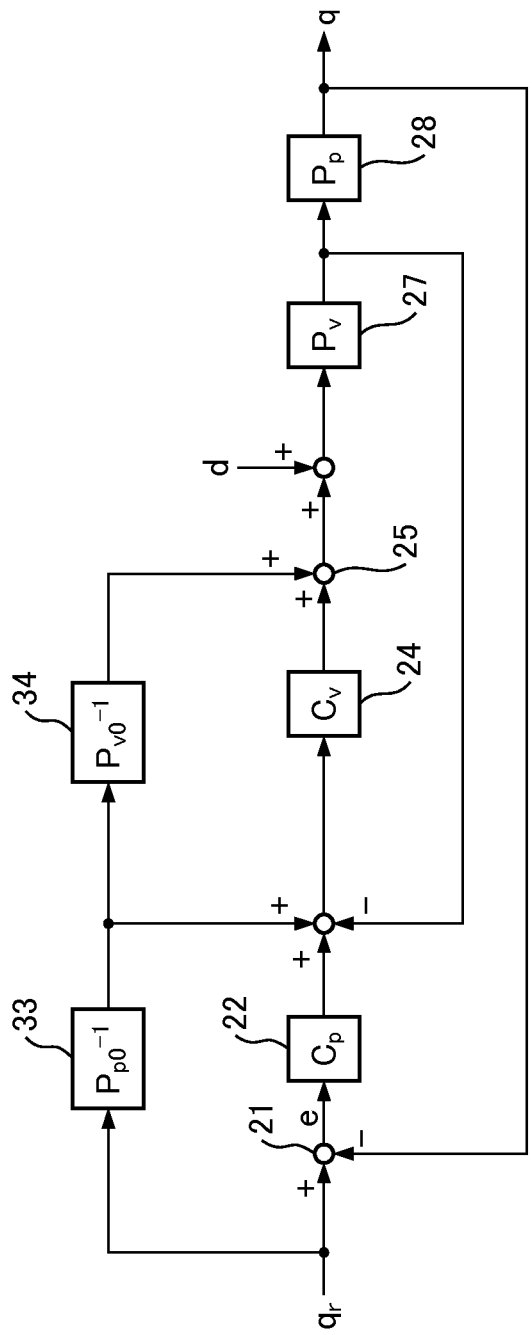
FIG. 3 is a block diagram representing a comparative example of the embodiment.

FIG. 3 is a block diagram representing a comparative example with respect to this embodiment. The same constituents as those of FIG. 2 are denoted by the same numeral. Unlike in FIG. 2, the state feedback loop 20C is not provided in FIG. 3. Accordingly, the gain setters 30 and 31, and the velocity compensator 35 are not provided either. In addition, the velocity gain kv is not added in the velocity compensator 34.

FIG. 4 is a diagram representing movement locus of a tool when a work placed on the table is made to relatively moves in the X-Y direction and cylindrical processing on the work is performed by tool in which the rotational axis extends in a Z-direction with the configuration according to the block diagram of FIG. 3. In the figure, dotted lines represent the command value and solid lines represent the measured value, and the error between the command value and the measured value is illustrated in an enlarged scale on a roundness graph drawn along the X-Y plane. As illustrated in FIG. 4, the movement of the feed shaft 11 is delayed at positions A to D where the moving direction of the feed shaft 11 is changed. Accordingly, at the positions A to D, the movement locus outwardly protrudes (quadrant projection), which indicates that the error between the measured value and the command value is increased.

To prevent such delay of the movement, it is preferable to increase the gain of the compensators 22 and 24 of the feedback loop. FIG. 5 is a roundness graph representing a relation between the command value and the measured value obtained upon performing the cylindrical processing, with an increased gain of the compensators 22 and 24 in FIG. 3 (e.g., twice of the gain in FIG. 4). In FIG. 5, although the quadrant projections are smaller compared with FIG. 4, the tool oscillates (vibrates) at the positions A to D. Although a further increase of the gain of the compensators 22 and 24 may lead to reduced quadrant projection, in this case the control system becomes unstable and the oscillation becomes more intense. Accordingly, the gain of the compensators 22 and 24 is unable to be increased beyond a certain limit.

Figure 6:
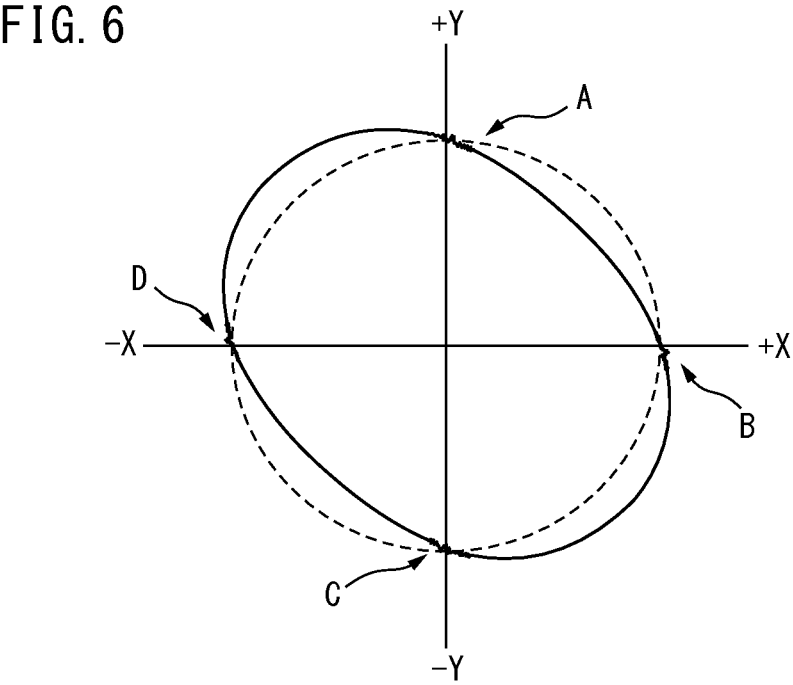
FIG. 6 is a diagram representing an example of movement locus of the tool obtained upon performing the circular processing with the configuration according to the block diagram of FIG. 3, with addition of a state feedback loop.

FIG. 6 is a roundness graph representing a relation between the command value and the measured value obtained upon performing the cylindrical processing with the configuration according to the block diagram of FIG. 3, with addition of only the state feedback loop 20C in FIG. 2. In this example, the gain of the compensators 22 and 24 is increased further, for example to 10 times of the gain in FIG. 4. In comparison with FIG. 5, the quadrant projection is suppressed because of the increase of the gain, and no difference from the command value is created at the positions A to D. Further, the control system is stabilized with the addition of the state feedback loop 20C, and no oscillation is observed. However, the addition of the state feedback loop 20C is not taken into account in the feed forward loop 20B, and therefore the measured value deviates from the command value at positions other than the positions A to D, such that the locus deviates from the true round shape.

Figure 7:
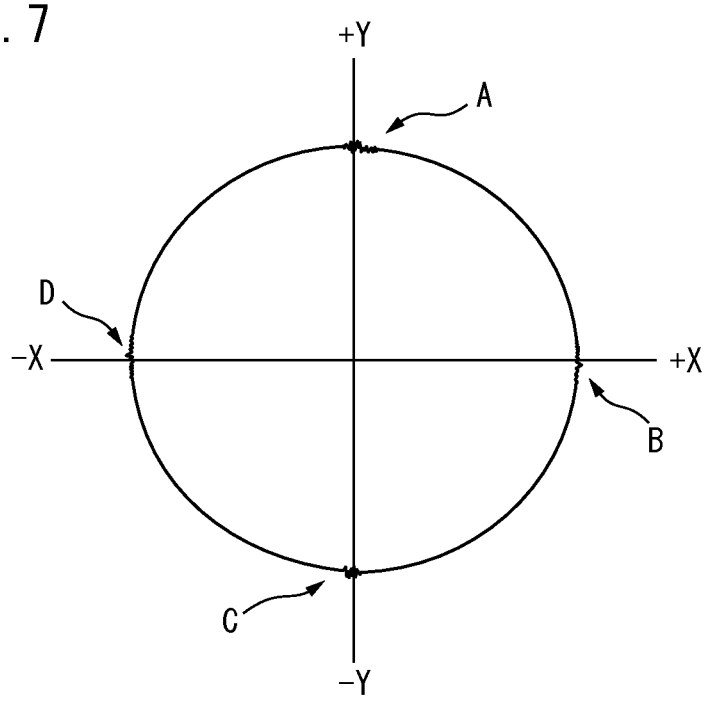
FIG. 7 is a diagram representing an example of movement locus of a tool obtained upon performing the circular processing with the configuration according to the block diagram of FIG. 2.

FIG. 7 is a roundness graph representing a relation between the command value and the measured value obtained upon performing the cylindrical processing with the configuration according to this embodiment illustrated in FIG. 2. The magnitude of the gain of the compensators 22 and 24 is the same as in FIG. 6. In comparison with FIG. 6, the movement locus forms a true round shape, which indicates that the measured value agrees with the command value over the entirety of the movement locus. In this case, the positional error can be minimized, when there is an unpredictable disturbance.

In this embodiment, as described above, the velocity feedback loop is provided inside the position feedback loop so as to form the cascade connection, the state feedback signal which is related to velocity loop and obtained by multiplying the output of the velocity feedback loop by the velocity gain kv and the state feedback signal which is related to position loop and obtained by multiplying the output of the position feedback loop by the position gain kp are subtracted from the torque command τ1, and the torque command τ2 obtained by the mentioned subtraction is outputted to the velocity control object 27. Such an arrangement stabilizes the control object, and therefore the feedback gain of the compensators 22 and 24 of the feedback loop 20A can be increased and the impact of the disturbance d can be effectively suppressed.

In addition, in the feed forward loop 20B the position command qr is multiplied by the gain corresponding to the gains kp and kv of the state feedback loop 20C, and added to the torque command τ. Such an arrangement mitigates the influence of the state feedback loop 20C and suppresses the positional error when the position command is changed, thereby preventing the movement locus from being collapsed during the circular processing.

Figure 8:
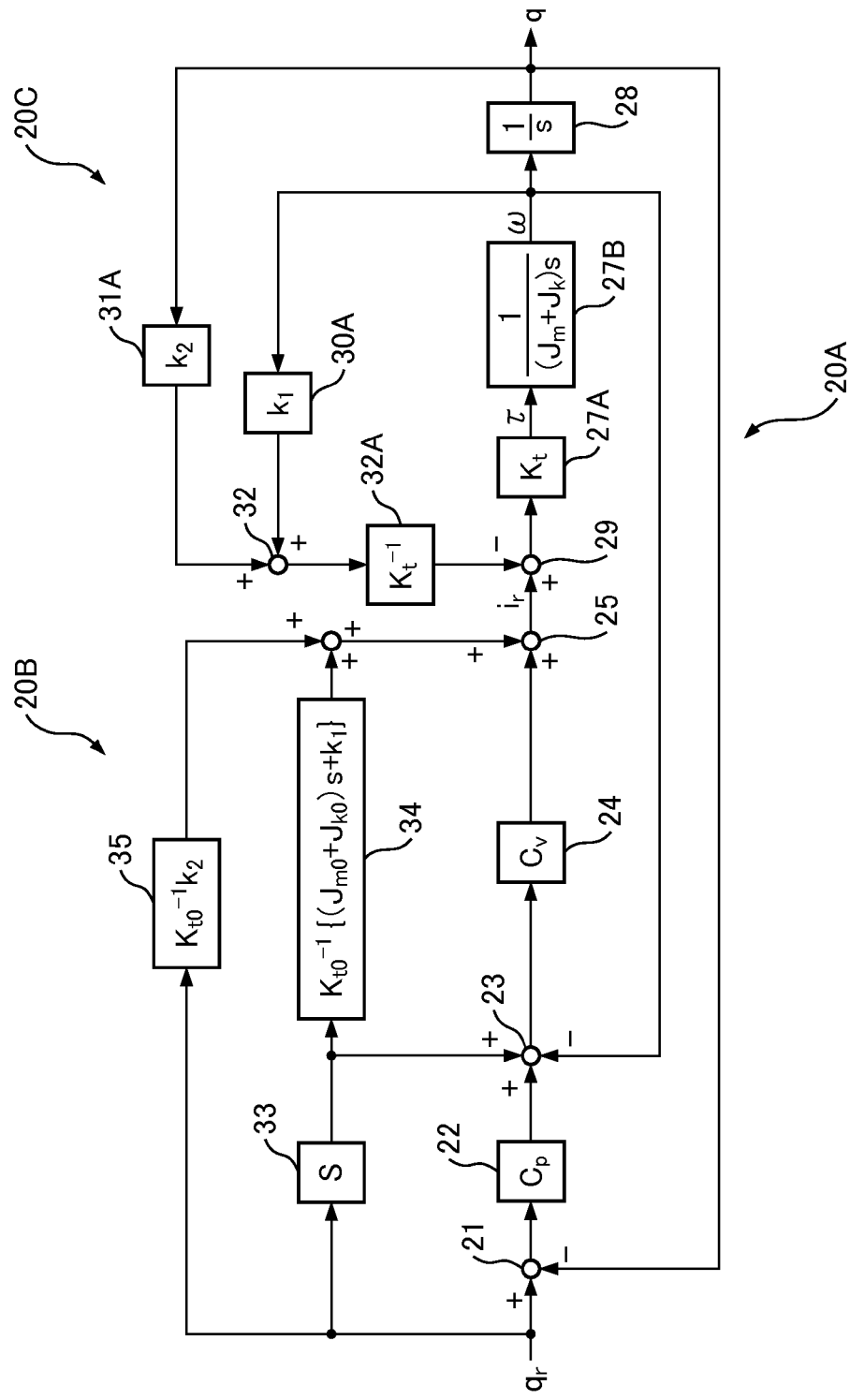
FIG. 8 is a block diagram representing an example of an actually configured diagram based on FIG. 2.

FIG. 8 is a more specific block diagram based on FIG. 2, which may be applied when it is assumed that, for example, a shaft connecting between the servo motor 10 and the load (on the side of feed axis) has high rigidity, in other words that the load is driven without a delay from the rotation of the servo motor 10. The same constituents as those of FIG. 2 are denoted by the same numeral.

In FIG. 8, the adder 25 in which the feed forward command has been added outputs a control signal ir (control current) to a torque converter 27A through the adder 29. The torque converter 27A outputs the torque command τ corresponding to the control signal ir to a velocity control object 27B, in accordance with predetermined characteristics of the servo amplifier 9 and the servo motor 10 (torque constant Kt). A model of the velocity control object 27B may be expressed as the following equation (I) using a load inertia Jk, a motor inertia Jm, and a Laplacian s.

$$1/((Jm+Jk) \cdot s) \quad (I)$$

In the equation (I) above, (Jm+Jk) may be fixed by, for example, gradually changing the frequency of the servo motor 10 to obtain frequency responses, and obtaining the relation between the frequency and the gain (transfer function) on the basis of the command value and the output of the position detector 12 corresponding to each frequency.

The velocity signal ω outputted from the velocity control object 27B is inputted in the position control object 28. The position control object 28 is an integrator and expressed by 1/s. The velocity signal ω outputted from the velocity control object 27B is inputted in a velocity gain setter 30A, and the position signal q outputted from the position control object 28 is inputted in a position gain setter 31A. The velocity gain setter 30A multiplies the velocity signal ω by a velocity gain k1. The position gain setter 31A multiplies the position signal q by a position gain k2. The torque commands outputted from the gain setters 30A and 31A are added in the adder 32, and outputted to a current converter 32A. The current converter 32A is represented by the reciprocal $Kt^{-1}$ of the torque constant Kt, and converts the torque command into a current command. The current command outputted from the current converter 32A is added in the adder 29, so that the control signal it is corrected.

The position compensator 33 in the feed forward loop 20B is represented by the reciprocal s of the position control object 28, and a model of the velocity compensator 35 may be expressed as the following equation (II) using a nominal model $Kt_0$ of the torque constant Kt and the position gain k2.

$$Kt_0^{-1} \cdot k2 \quad (II)$$

A model of the velocity compensator 34 may be expressed as the following equation (III) using a nominal model $Jk_0$ of the load inertia Jk, a nominal model $Jm_0$ of the motor inertia Jm, the Laplacian s, the velocity gain k1, and the reciprocal $Kt_0^{-1}$ of a nominal model $Kt_0$ of the torque constant Kt.

$$Kt_0^{-1}((Jm_0+Jk_0)s+k1) \quad (III)$$

Figure 9:
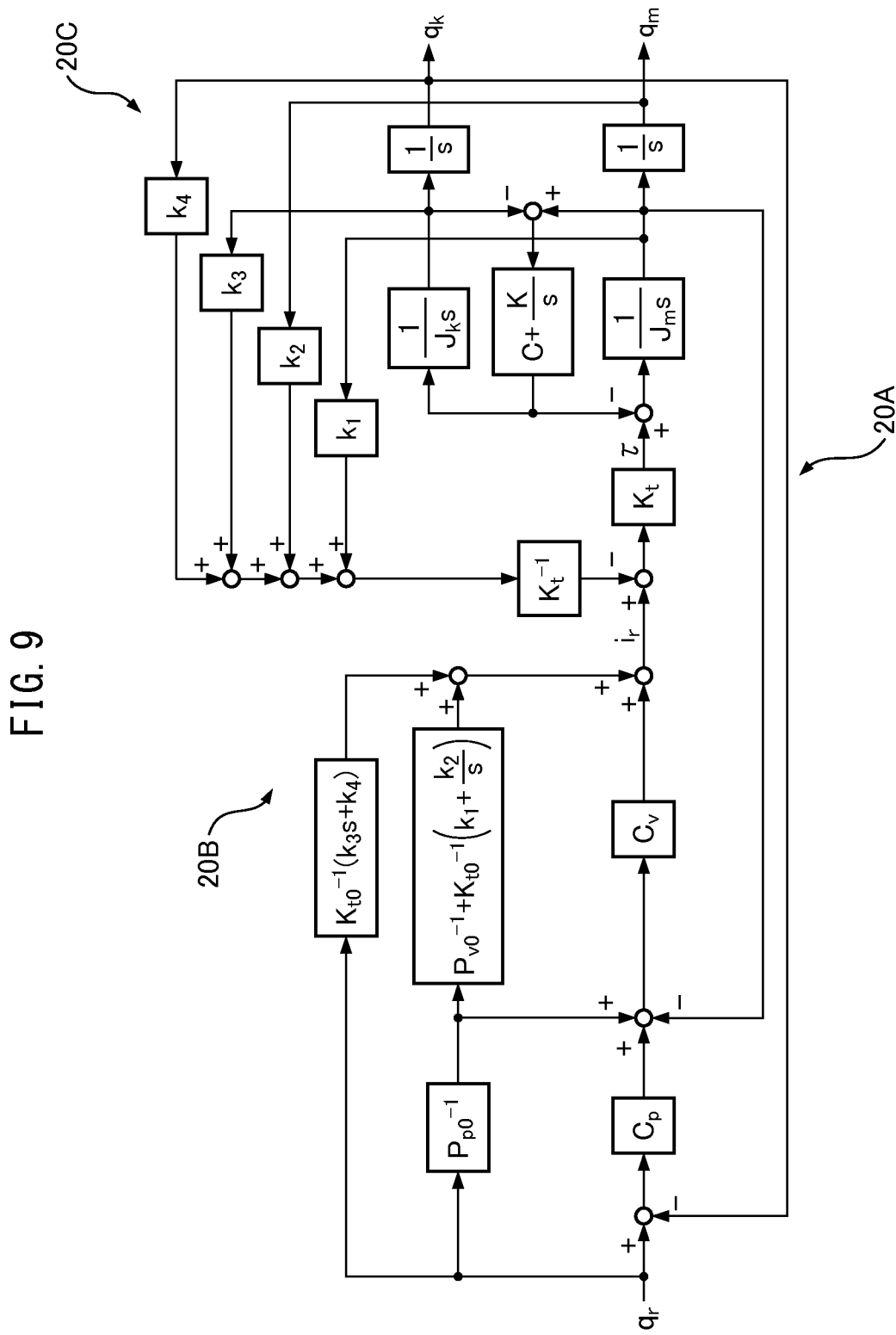
FIG. 9 is a block diagram representing an example of a variation of FIG. 8.

FIG. 9 is a block diagram representing a variation of FIG. 8. Unlike FIG. 8, FIG. 9 may be applied when it is assumed that, for example, the shaft connecting between the servo motor 10 and the load has low rigidity, in other words that the load is driven with a delay from the rotation of the servo motor 10. In the figure, K represents a coefficient indicating the rigidity between the servo motor 10 and the load, known as spring constant, and C represents an attenuation coefficient between the servo motor 10 and the load. The motor inertia Jm, the load inertia Jk, the attenuation coefficient C, and the rigidity K may be identified, for example by changing the motor frequency thereby obtaining the transfer function. When the shaft rigidity has low rigidity, the position of the load deviates from the position of the servo motor 10, and therefore the position detector 12 has to be configured to detect the position of the load.

When the shaft rigidity is low, the control system may be construed as a two-inertia system. In this case, as illustrated in the figure, the gain of the state feedback loop 20C may be divided into a feedback gain k1 related to the velocity of the servo motor 10 (motor velocity gain), a feedback gain k2 related to the position of the servo motor 10 (motor position gain), a feedback gain k3 related to the velocity of the load (load velocity gain), and a feedback gain k4 related to the position of the load (load position gain), to thereby express the velocity gain kv and the position gain kp as a function.

A model Pp of the position control object 28 in FIG. 2 may be expressed as the following equation (IV) using the rigidity K, the attenuation coefficient C, the Laplacian s, and the load inertia Jk.

$$Pp=(Cs+K)/((Jk^2+Cs+K)s) \quad (IV)$$

A model Pv of the velocity control object 27 in FIG. 2 may be expressed as the following equation (V) using the motor inertia Jm, the load inertia Jk, the rigidity K, the attenuation coefficient C, the torque constant Kt, and the Laplacian s.

$$Pv=(Jks^2+Cs+K)Kt/((JmJks^2+C(Jm+Jk)s+K(Jm+Jk))s) \quad (V)$$

$Pp_0^{-1}$, and $Pv_0^{-1}$ included in the feed forward loop 20B are the reciprocals of the nominal model $Pp_0$, $Pv_0$ of Pp and Pv in the equations (IV) and (V), respectively, and may be expressed as the following equations (VI), (VII). $K_0$ and $C_0$ are nominal models of the rigidity K and the attenuation coefficient C, respectively.

$$Pp_0^{-1}=((Jk_0s^2+C_0s+K_0)s/(C_0s+K_0)) \quad (VI)$$

$$Pv_0^{-1}=((Jm_0Jk_0s^2+C_0(Jm_0+Jk_0)s+K_0(Jm_0+Jk_0))s)/(Jk_0s^2+C_0s+K_0)Kt_0 \quad (VII)$$

Figure 10:
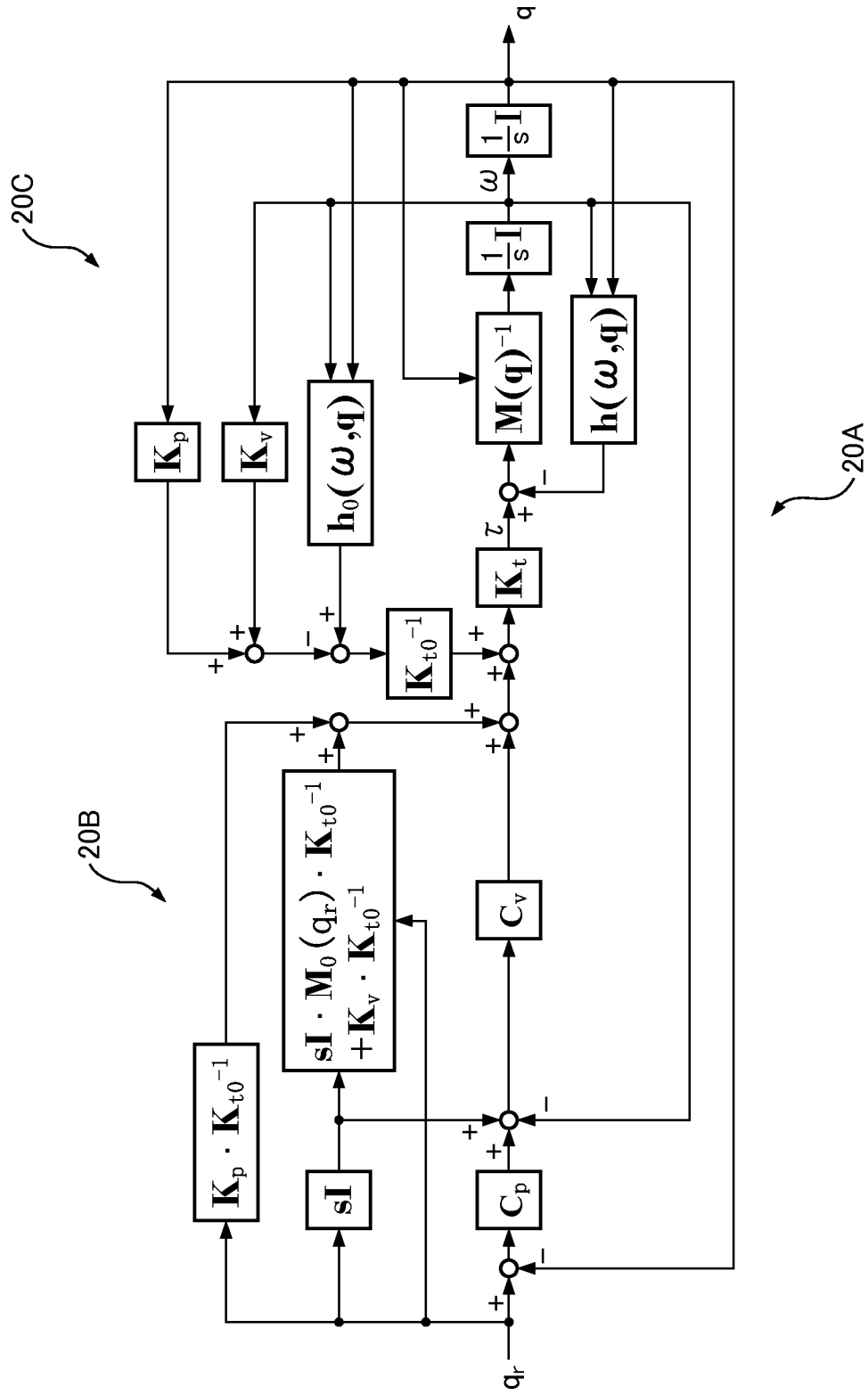
FIG. 10 is a block diagram representing another example of variation of FIG. 8.

FIG. 10 is a block diagram representing another variation of FIG. 8. FIG. 10 is applicable, for example, to a 5-axis machine. The 5-axis machine includes, in addition to linear feed axises respectively disposed in the X-direction, the Y-direction, and the Z-direction, rotary feed axises to be rotated, for example, in an A-direction about the X-direction and in a C-direction about the Z-direction. When the machine rotates in the A-direction or C-direction, the feed mechanism is subjected to a centrifugal force and Coriolis force, and also the gravity acting on the feed mechanism changes because of a change in position of the center of gravity of the machine. When the machine tool only includes the linear feed axises, each of the feed axises may independently constitute a control circuit since the action of the feed axis is not affected by other feed axises. In the machine tool including the rotary feed axises, in contrast, the moment of inertia of the machine varies depending on the rotational position of the motor and a centrifugal force or Coriolis force is generated according to the motor rotation velocity, and therefore the action of the rotary feed axis affects other feed axises.

Generally, a motion equation of the machine including the rotary feed axis is expressed as the following equation (VIII).

$$\tau = M(q) \cdot d\omega/dt + h(\omega,q) \quad (VIII)$$

When the machine includes 5 axises, q in the equation (VIII) represents a commanded position vector containing the components of the X-direction, the Y-direction, the Z-direction, the A-axis, and the C-axis, ω represents a value obtained by a first order differentiation of the commanded position vector q with time, dω/dt represents a value obtained by a second order differentiation of the commanded position vector q with time, M(q) represents the inertia matrix of 5 rows by 5 columns, h(ω, q) represents a non-linear force vector determined by using the velocity and the position as parameters, such as Coriolis force, centrifugal force, and a gravity term.

With reference to the foregoing, a block diagram modeled by a 5-axis vector or a matrix of 5 rows by 5 columns is illustrated in FIG. 10. That is, in FIG. 10, qr represents the commanded position vector, q represents an actual position vector, Cp represents a position compensator matrix, Cv represents a velocity compensator matrix, Kt represents a torque constant matrix, $Kt_0$ represents a torque constant matrix of the nominal model, Kp represents a position gain matrix, Kv represents a velocity gain matrix, I represents a unit matrix, $M_0(qr)$ represents an inertia matrix of the nominal model, and s represents the Laplacian.

In FIG. 10, the non-linear force vector h (ω, q) is subtracted from the torque command τ in the feedback loop 20A, so as to linearize the torque command τ as the following equation (IX). Accordingly, the model Pv of the velocity control object (see FIG. 2) may be expressed as the following equation (X).

$$\tau = M(q) \cdot d\omega/dt \qquad \text{(IX)}$$

$$Pv = Kt \cdot M(q)^{-1} \cdot 1/s \cdot I \qquad \text{(X)}$$

In the state feedback loop 20C, a non-linear force vector $h_0$ (ω, q) of the nominal model is added, contrary to the subtraction of the non-linear force vector h (ω, q) in the feedback loop 20A.

The specific application examples of the block diagram of FIG. 2 have been described as above, with respect to the cases where the rigidity between the servo motor 10 and the load is high (see FIG. 8), where the rigidity is low (see FIG. 9), and where the machine includes the rotary feed axises (see FIG. 10). However, the block diagram of FIG. 2 may be rewritten to various other specific models depending on the design of the machine tool. Therefore, the respective configurations of the velocity gain setter 30 (first multiplication unit) which multiplies the output of the velocity feedback loop by the velocity gain kv (first gain), the position gain setter 31 (second multiplication unit) which multiplies the output of the position feedback by the position gain kp (second gain), and the adder 26 (output unit) which subtracts the output of the velocity gain setter 30 and the output of the position gain setter 31 from the torque command τ1 and outputs the torque command τ2 obtained by the mentioned subtraction to the velocity control object 27 including the servo motor 10, are not limited to the aforementioned ones.

Although the control circuit includes the feedback loop 20A, the feed forward loop 20B, and the state feedback loop 20C constituting the cascade connection in the foregoing embodiment, the configuration of the feed axis control device is not limited to the above as long as at least the feedback loop 20A and the state feedback loop 20C are included. The most prominent feature of the machine tool feed axis control method according to the present invention lies in subtracting from the torque command τ the first state feedback signal obtained by multiplying the output of the velocity feedback loop by the velocity gain kv (first gain) and the second state feedback signal obtained by multiplying the output of the position feedback loop by the position gain kp (second gain), and outputting the torque command τ obtained by the mentioned subtraction to the velocity control object 27 including the servo motor 10, and such feature may be modified in various manners.

The description thus far given is merely exemplary, and in no way intended to limit the present invention to the foregoing embodiment and the variations thereof. The constituents of the embodiment and the variations thereof include those that may be substituted or are obviously substitutable without compromising the identity of the invention. In other words, different configurations which can be reached within the technical scope of the present invention will also be included in the present invention. Further, the foregoing embodiment may be combined with one or a plurality of the variations.

REFERENCE SIGNS LIST 10 servo motor
20A feedback loop
20B feed forward loop
20C state feedback loop
22 position compensator
24 velocity compensator
25, 26 adder
27 velocity control object
30, 31 gain setter
34, 35 velocity compensator

The invention claimed is:

1. A machine tool feed axis control method including forming a cascade-connection in which a velocity feedback loop including a velocity control unit is provided inside a position feedback loop including a position control unit to which a position command is inputted, and controlling a servo motor for driving the feed axis in accordance with a torque command outputted from a velocity control unit, the method comprising:
    subtracting from the torque command a first state feedback signal obtained by multiplying an output of the velocity feedback loop by a first gain and a second state feedback signal obtained by multiplying an output of the position feedback loop by a second gain; and
    outputting the torque command after the subtraction to a control object including the servo motor.

2. The machine tool feed axis control method according to claim 1, further comprising multiplying the position command by a feed forward gain based on the first gain and the second gain and adding the multiplied value to the torque command, via a feed forward loop.

3. A machine tool feed axis control device including a cascade-connection in which a velocity feedback loop including a velocity control unit is provided inside a position feedback loop including a position control unit to which a position command is inputted, and controlling a servo motor for driving the feed axis in accordance with a torque command outputted from a velocity control unit, the device comprising:
    a first multiplication unit which multiplies an output of the velocity feedback loop by a first gain;
    a second multiplication unit which multiplies an output of the position feedback loop by a second gain; and
    an output unit which subtracts an output of the first multiplication unit and an output of the second multiplication unit from the torque command, and outputs the torque command after the subtraction to a control object including the servo motor.

* * * * *